US012785283B2

(12) United States Patent
Chen et al.

(10) Patent No.: US 12,785,283 B2
(45) Date of Patent: Nov. 3, 2026

(54) ANTENNA STRUCTURE

(71) Applicant: Wistron NeWeb Corporation, Hsinchu (TW)

(72) Inventors: Jian-Zhong Chen, Hsinchu (TW); Cheng-Rui Zhang, Hsinchu (TW); Chia-Hao Chang, Hsinchu (TW); Hong-Jun Jian, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 78 days.

(21) Appl. No.: 18/794,255

(22) Filed: Aug. 5, 2024

(65) Prior Publication Data

US 2025/0055199 A1 Feb. 13, 2025

(30) Foreign Application Priority Data

Aug. 9, 2023 (TW) ................................ 112129907

(51) Int. Cl.
*H01Q 1/38* (2006.01)
*H01Q 1/50* (2006.01)
*H01Q 13/10* (2006.01)

(52) U.S. Cl.
CPC ............... *H01Q 13/10* (2013.01); *H01Q 1/38* (2013.01); *H01Q 1/50* (2013.01)

(58) Field of Classification Search
CPC ........... H01Q 1/24; H01Q 1/243; H01Q 1/38; H01Q 1/48; H01Q 1/50; H01Q 13/10; H01Q 5/37; H01Q 5/371; H01Q 9/42
See application file for complete search history.

(56) References Cited

U.S. PATENT DOCUMENTS

| | | | | |
|---|---|---|---|---|
| 3,757,343 A * | 9/1973 | Bogner | H01Q 21/08 | 343/770 |
| 6,639,560 B1 * | 10/2003 | Kadambi | H01Q 9/0442 | 343/702 |
| 7,701,407 B2 * | 4/2010 | Kanno | H01Q 13/106 | 343/767 |
| 11,799,203 B2 * | 10/2023 | Wu | H01Q 9/42 | |
| 12,562,494 B2 * | 2/2026 | Chu | H01Q 13/10 | |

FOREIGN PATENT DOCUMENTS

| | | |
|---|---|---|
| TW | 201712940 A | 4/2017 |
| TW | 201906228 A | 2/2019 |
| TW | 201931672 A | 8/2019 |

* cited by examiner

*Primary Examiner* — Tho G Phan
(74) *Attorney, Agent, or Firm* — McClure, Qualey & Rodack, LLP

(57) ABSTRACT

An antenna structure is disposed on a metal unit and includes a first slot, a second slot, and a short-circuiting portion. The first slot is formed on the metal unit. The second slot is formed on the metal unit and located at one side of the first slot. The second slot is configured to receive a signal feed. The short-circuiting portion is in a floating state and extends across the first slot without being in direct contact with the first slot.

10 Claims, 8 Drawing Sheets

ANTENNA STRUCTURE

RELATED APPLICATIONS

This application claims the benefit of priority to Taiwan Patent Application No. 112129907, filed on Aug. 9, 2023. The entire content of the above identified application is incorporated herein by reference.

BACKGROUND

Technical Field

The present disclosure relates to an antenna structure, and more particularly, to a slot antenna structure.

Description of Related Art

With the increasing demand for wireless transmission, most electronic devices are equipped with antennas for transmitting and receiving data wirelessly. However, with the development of electronic devices heading toward a thin-and-light trend, the size of antenna components in electronic devices must also be reduced. In addition, the antennas in existing electronic devices are insufficient in providing Wi-Fi 6E bandwidth and have poor gain.

From this, developing an antenna structure with multiple antenna bandwidths in a limited space is a goal in the related industry.

SUMMARY

It is an aspect of the present disclosure to provide an antenna structure that is disposed on a metal unit and includes a first slot, a second slot, and a short-circuiting portion. The first slot is formed on the metal unit. The second slot is formed on the metal unit and located at one side of the first slot. The second slot is configured to receive a signal feed. The short-circuiting portion extends across the first slot, the short-circuiting portion is in a floating state and does not directly contact the first slot.

It is another aspect of the present disclosure to provide an antenna structure that is disposed on a metal unit and includes a first slot, a second slot, a grounding portion, and a short-circuiting portion. The first slot is formed on the metal unit and configured to receive a signal feed. The second slot is formed on the metal unit and located at one side of the first slot. The grounding portion is coupled to the metal unit. The short-circuiting portion corresponds to the second slot and is coupled to the grounding portion.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
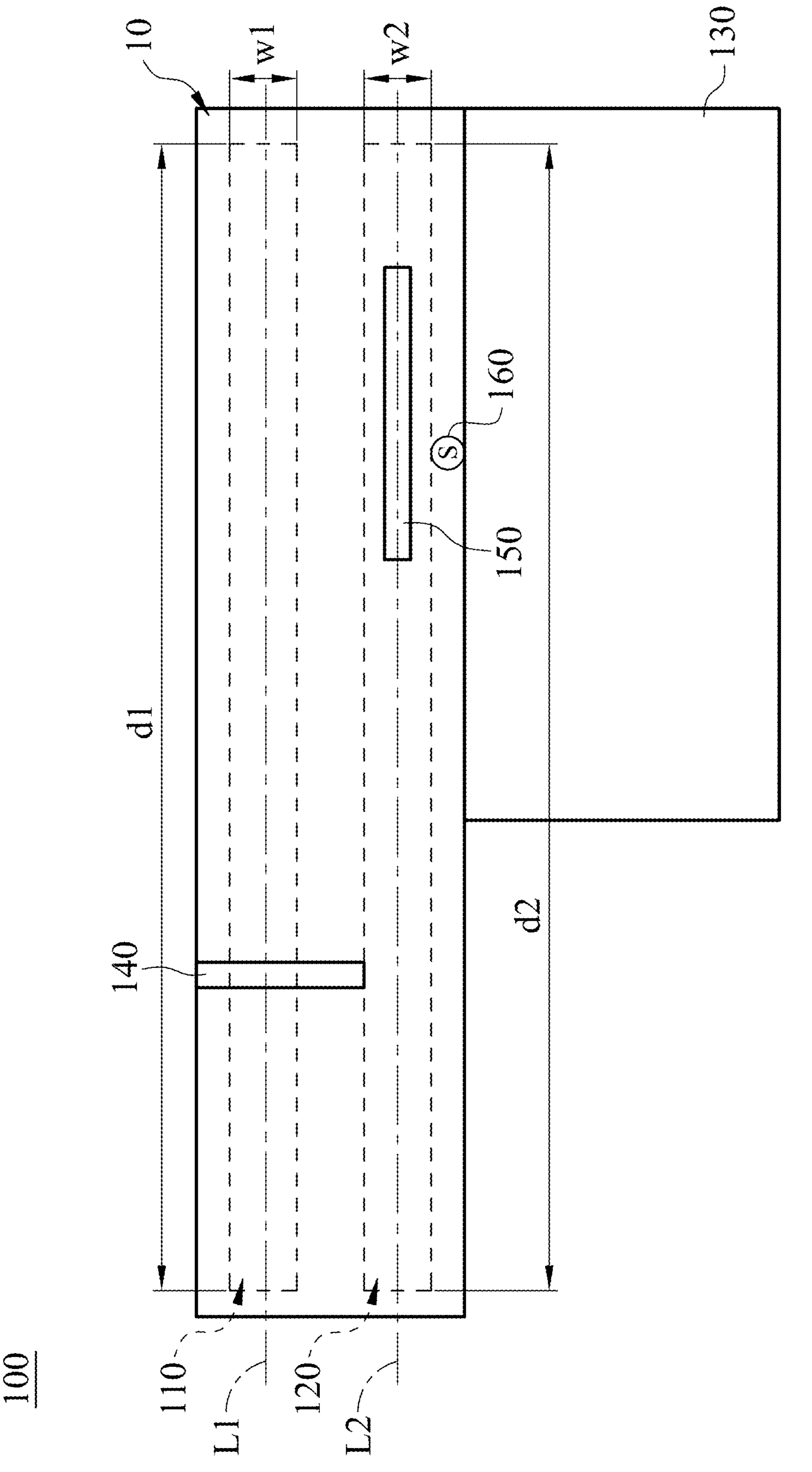
FIG. 1 is a schematic diagram of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the present disclosure, when an element (i.e. a unit or a module) is described to "connect" to another element, it means to that the element is directly connected to the other element, or that certain element is indirectly connected to the other element, which implies that there is another element between the element and the other element. When an element is described to "directly connect" to another element, it means to no other element is between the element and the other element.

FIG. 1 is a schematic diagram of an antenna structure 100 according to a first embodiment of the present disclosure. Referring to FIG. 1, the antenna structure 100 is disposed on a metal unit 10 and includes a first slot 110, a second slot 120, a grounding portion 130, a short-circuiting portion 140, a radiating portion 150, and a feeding portion 160. The first slot 110 and the second slot 120 are formed on the metal unit 10. The grounding portion 130 is coupled to the metal unit 10, and the short-circuiting portion 140, the radiating portion 150, and the feeding portion 160 are disposed on the metal unit 10.

In the first embodiment, the metal unit 10 may be integrally formed on the housing structure of an electronic device (such as a laptop, personal digital assistant, or other portable electronic devices), but the present disclosure is not limited thereto. The first slot 110 and the second slot 120 are closed slots. The grounding portion 130 is a ground copper foil and is coupled to a system ground of the electronic device, but the present disclosure is not limited thereto. The short-circuiting portion 140, the radiating portion 150, and the feeding portion 160 may be formed on the surface of a flexible printed circuit (FPC) or made on a plastic component by laser direct structuring (LDS). The carrier (FPC or plastic component) is placed such that the positions of the short-circuiting portion 140, the radiating portion 150, and the feeding portion 160 on the carrier correspond to the positions of the first slot 110 and the second slot 120 on the metal unit 10, and then the relative positions between the carrier and the metal unit 10 are fixed to form the antenna structure 100. The relative distance between the carrier and the metal unit 10 is less than or equal to 3 millimeters, but the present disclosure is not limited thereto. Thus, the antenna structure 100 can be integrated with the device in different ways according to the spatial configuration of the device to overcome the limitation on the antenna position.

Referring to FIG. 1, the first slot 110 is formed on the metal unit 10 along a first axis direction L1, and the second slot 120 is formed on the metal unit 10 along a second axis direction L2. The second slot 120 is located on one side of the first slot 110 and is configured for receiving a signal feed. The second axis direction L2 is parallel to the first axis direction L1, and the first slot 110 and the second slot 120 are spaced apart by a spacing. The first slot 110 has a first length d1 along the first axis direction L1 and has a first width w1, and the second slot 120 has a second length d2 along the second axis direction L2 and has a second width w2. The first length d1 is equal to the second length d2, and the first width w1 is equal to the second width w2. In the first embodiment, the first length d1 and the second length d2 are both 50 millimeters; the first width w1 and the second width w2 are both 2 millimeters, but the present disclosure is not limited thereto.

Referring to FIG. 1, the short-circuiting portion 140 extends across the first slot 110. The short-circuiting portion 140 is in a floating state and does not directly contact the first slot 110. In the first embodiment, the short-circuiting portion 140 extends across the first slot 110 perpendicular to the first axis direction L1, but the present disclosure is not limited thereto. In other embodiments, the short-circuiting portion 140 extends across the first slot 110 in a direction intersecting with the first axis direction L1. The radiating portion 150 corresponds to the second slot 120. Specifically, the radiating portion 150 may be formed on the surface of a flexible printed circuit (FPC) or formed on a plastic component by laser direct structuring (LDS), with its vertical projection located within the second slot 120, but the present disclosure is not limited thereto. In the first embodiment, the short-circuiting portion 140 and the radiating portion 150 are not directly coupled or connected. The length of the radiating portion 150 is less than the second length d2. In the first embodiment, the length of the radiating portion 150 is 13 millimeters, but the present disclosure is not limited thereto.

Referring to FIG. 1, the feeding portion 160 is adjacent to the radiating portion 150 and located on the side of the second slot 120 away from the first slot 110. The feeding portion 160 is electrically connected to a coaxial transmission line (not shown) and coupled to a signal source S to feed signals. Specifically, signals are fed from the feeding portion 160 to the radiating portion 150, and resonance is formed at the first slot 110 and the second slot 120 to generate transmission signals of multiple frequency bands.

Therefore, the antenna structure 100 of the present disclosure utilizes the positional arrangement of the first slot 110, the second slot 120, the short-circuiting portion 140, the radiating portion 150, and the feeding portion 160 to excite transmission signals of multiple frequency bands, providing a wider bandwidth and better antenna efficiency.

Figure 2:
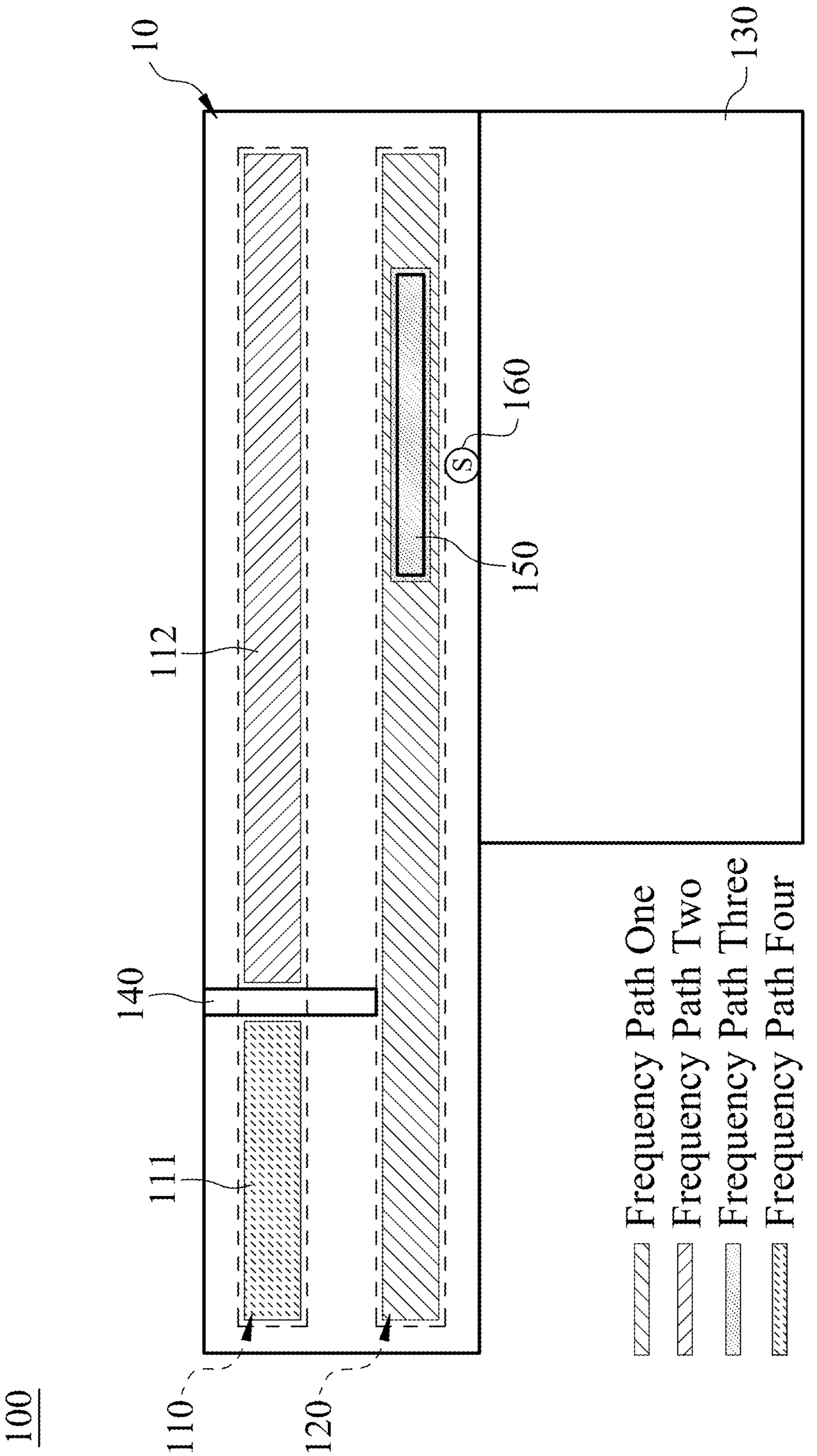
FIG. 2 is a schematic diagram illustrating frequency paths one, two, three, and four of the antenna structure shown in FIG. 1.
Figure 3:
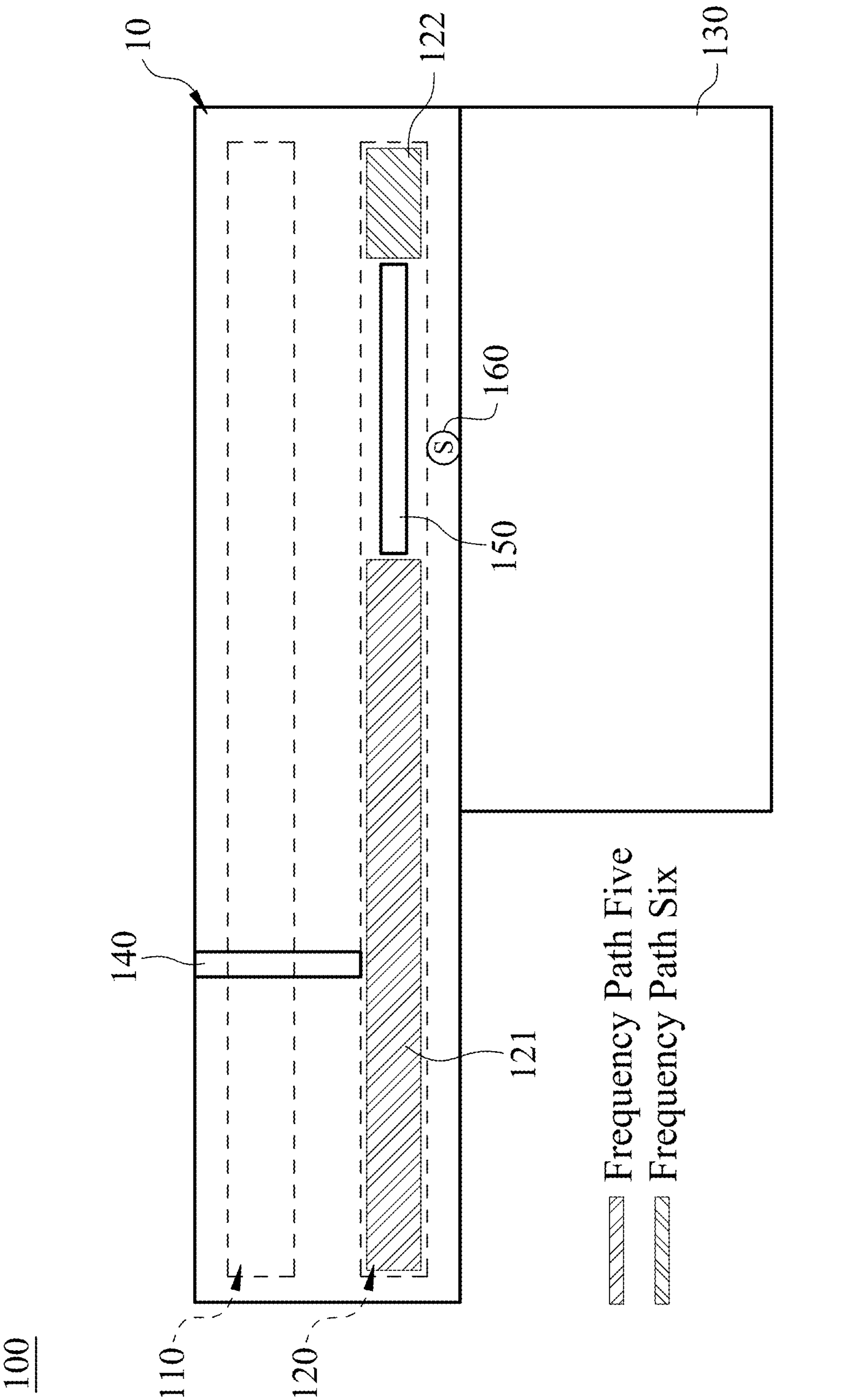
FIG. 3 is a schematic diagram illustrating frequency paths five and six of the antenna structure shown in FIG. 1.
Figure 4:
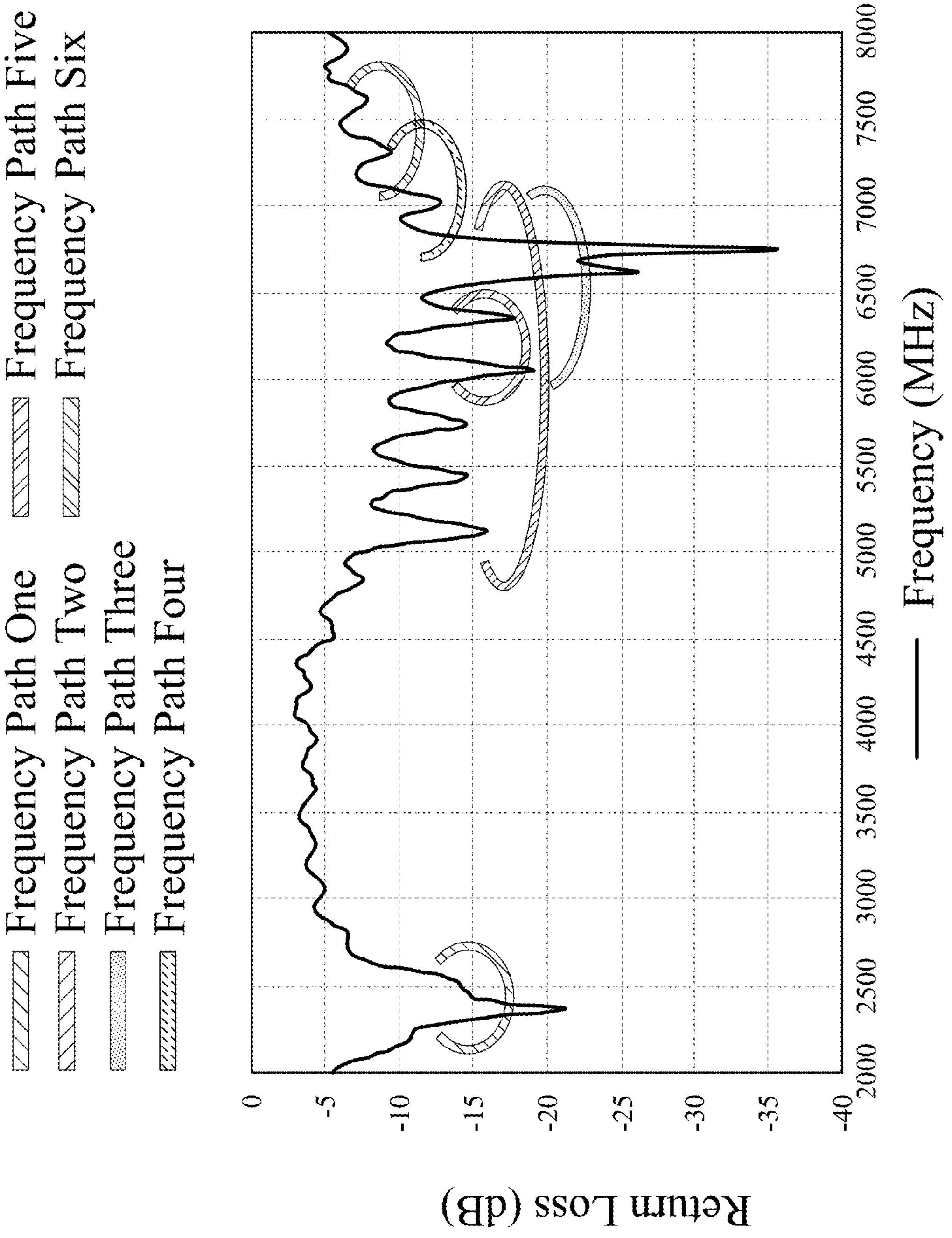
FIG. 4 is a graph illustrating overall bandwidth waveform of frequency and return loss of the antenna structure shown in FIG. 1.

FIG. 2 is a schematic diagram illustrating frequency paths one, two, three and four of the antenna structure 100 shown in FIG. 1. FIG. 3 is a schematic diagram illustrating frequency paths five and six of the antenna structure 100 shown in FIG. 1. FIG. 4 is a graph illustrating overall bandwidth waveform of frequency and return loss of the antenna structure 100 shown in FIG. 1.

Referring to FIGS. 2 and 4, the antenna structure 100 provides multiple frequency paths, including frequency path one, frequency path two, frequency path three, and frequency path four, through the radiating portion 150. The short-circuiting portion 140 divides the first slot 110 into a first portion 111 and a second portion 112. The lengths of the first portion 111 and the second portion 112 are not equal. In the first embodiment, the length of the second portion 112 is greater than the length of the first portion 111. The length of the first portion 111 is 12.5 millimeters, and the length of the second portion 112 is 36.5 millimeters, but the present disclosure is not limited thereto. The radiating portion 150 couples and excites the second slot 120 to form the frequency path one, providing a resonant frequency between 2300 MHz and 2700 MHz. The radiating portion 150 couples and excites the second portion 112 to form the frequency path two, providing a resonant frequency between 4850 MHz and 6800 MHz. The radiating portion 150 itself forms the frequency path three, providing a resonant frequency between 6000 MHz and 7100 MHz. The radiating portion 150 couples and excites the first portion 111 to form the frequency path four, providing a resonant frequency between 6200 MHz and 7500 MHz.

Therefore, through the coupling and excitation of the radiating portion 150, the frequency path one formed by the second slot 120 can provide low-frequency characteristics. The frequency path two formed by the second portion 112 can provide some mid-to-high frequency characteristics. The frequency path three formed by the radiating portion 150 itself can provide other mid-to-high frequency characteristics. The frequency path four formed by the first portion 111 can provide some high-frequency characteristics.

Referring to FIGS. 3 and 4, the antenna structure 100 provides the frequency paths five and six through the radiating portion 150. The radiating portion 150 divides the second slot 120 into a first section 121 and a second section 122. The lengths of the first section 121 and the second section 122 are not equal. In the first embodiment, the length of the first section 121 is greater than the length the second section 122. The length of the first section 121 is 27 millimeters, and the length of the second section 122 is 10 millimeters, but the present disclosure is not limited thereto. The radiating portion 150 couples and excites the first section 121 to form the frequency path five, providing a resonant frequency between 5800 MHz and 6500 MHz. The radiating portion 150 couples and excites the second section 122 to form the frequency path six, providing a resonant frequency between 7000 MHz and 7800 MHz.

Therefore, through the coupling and excitation of the radiating portion 150, the frequency path five formed by the first section 121 can provide some mid-to-high frequency characteristics, and the frequency path six formed by the second section 122 can provide Wi-Fi 6E characteristics.

Figure 5:
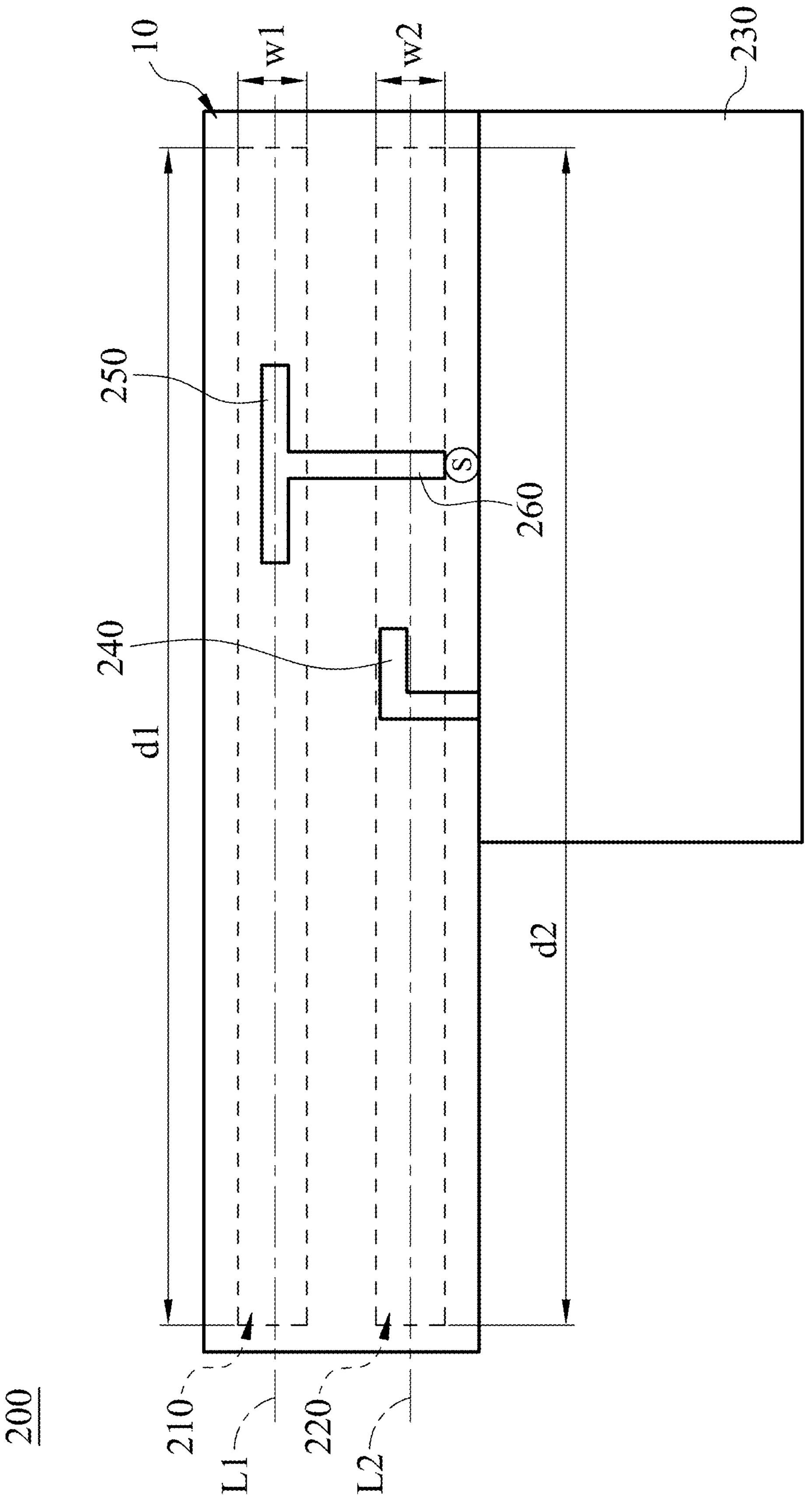
FIG. 5 is a schematic diagram of an antenna structure according to a second embodiment of the present disclosure.

FIG. 5 is a schematic diagram of an antenna structure 200 according to a second embodiment of the present disclosure. The antenna structure 200 is disposed on a metal unit 10 and includes a first slot 210, a second slot 220, a grounding portion 230, a short-circuiting portion 240, a radiating portion 250, and a feeding portion 260. The first slot 210 and the second slot 220 are formed on the metal unit 10. The grounding portion 230 is coupled to the metal unit 10, and the short-circuiting portion 240, the radiating portion 250, and the feeding portion 260 are disposed on the metal unit 10.

In the second embodiment, the metal unit 10 may be integrally formed on the housing structure of an electronic device (such as a laptop, personal digital assistant, or other portable electronic devices), but the present disclosure is not limited thereto. The first slot 210 and the second slot 220 are closed slots. The short-circuiting portion 240, the radiating portion 250, and the feeding portion 260 may be formed on the surface of a flexible printed circuit (FPC) or made on a plastic component by laser direct structuring (LDS). The positions of the short-circuiting portion 240, the radiating portion 250, and the feeding portion 260 on the carrier (FPC or plastic component) correspond to the positions of the first slot 210 and the second slot 220 on the metal unit 10, thereby fixing the relative positions between the carrier and the metal unit 10 to form the antenna structure 200. The relative distance between the carrier and the metal unit 10 is less than or equal to 3 millimeters, but the present disclosure is not limited thereto. The grounding portion 230 is the same as the grounding portion 130 in the first embodiment and will not be described herein. Thus, the antenna structure 200 can be integrated with the device in different ways according to the spatial configuration of the device to overcome the limitation on the antenna position.

Referring to FIG. 5, the first slot 210 is formed on the metal unit 10 along a first axis direction L1 for providing a signal feed, and the second slot 220 is formed on the metal unit 10 along a second axis direction L2. The second slot 220 is located on one side of the first slot 210. In the second embodiment, the structural dimensions of the first slot 210 and the second slot 220 are the same as those of the first slot 110 and the second slot 120 in the first embodiment and will not be described herein.

Referring to FIG. 5, the short-circuiting portion 240 corresponds to the second slot 220 and is coupled to the grounding portion 230. The radiating portion 250 corresponds to the first slot 210. Specifically, the short-circuiting portion 240 and the radiating portion 250 may be formed on the surface of a flexible printed circuit (FPC) or separately formed on a plastic component by laser direct structuring (LDS), with the vertical projection of the short-circuiting portion 240 located within the second slot 220 and the vertical projection of the radiating portion 250 located within the first slot 210, but the present disclosure is not limited thereto. In the second embodiment, the short-circuiting portion 240 and the radiating portion 250 are not directly coupled or connected. In the second embodiment, the short-circuiting portion 240 is substantially L-shaped.

Referring to FIG. 5, the feeding portion 260 is coupled to the radiating portion 250. The feeding portion 260 extends across the second slot 220 in a direction perpendicular to the second axis direction L2 and extends towards the first slot 210 for providing signal feed. The feeding portion 260 is electrically connected to a coaxial transmission line (not shown) and coupled to a signal source S for signal feeding. Specifically, signals are fed from the feeding portion 260 to the radiating portion 250, and resonance is formed at the first slot 210 and the second slot 220 to generate transmission signals of multiple frequency bands. Additionally, by extending the feeding portion 260 across the second slot 220 towards the first slot 210, the formed low-frequency band can be kept away from the grounding portion 230, further improving the antenna radiation pattern to adapt to different implementation environments.

Therefore, the antenna structure 200 of the present disclosure utilizes the positional arrangement of the first slot 210, the second slot 220, the short-circuiting portion 240, the radiating portion 250, and the feeding portion 260 to excite transmission signals of multiple frequency bands, providing a wider bandwidth and better antenna efficiency.

Figure 6:
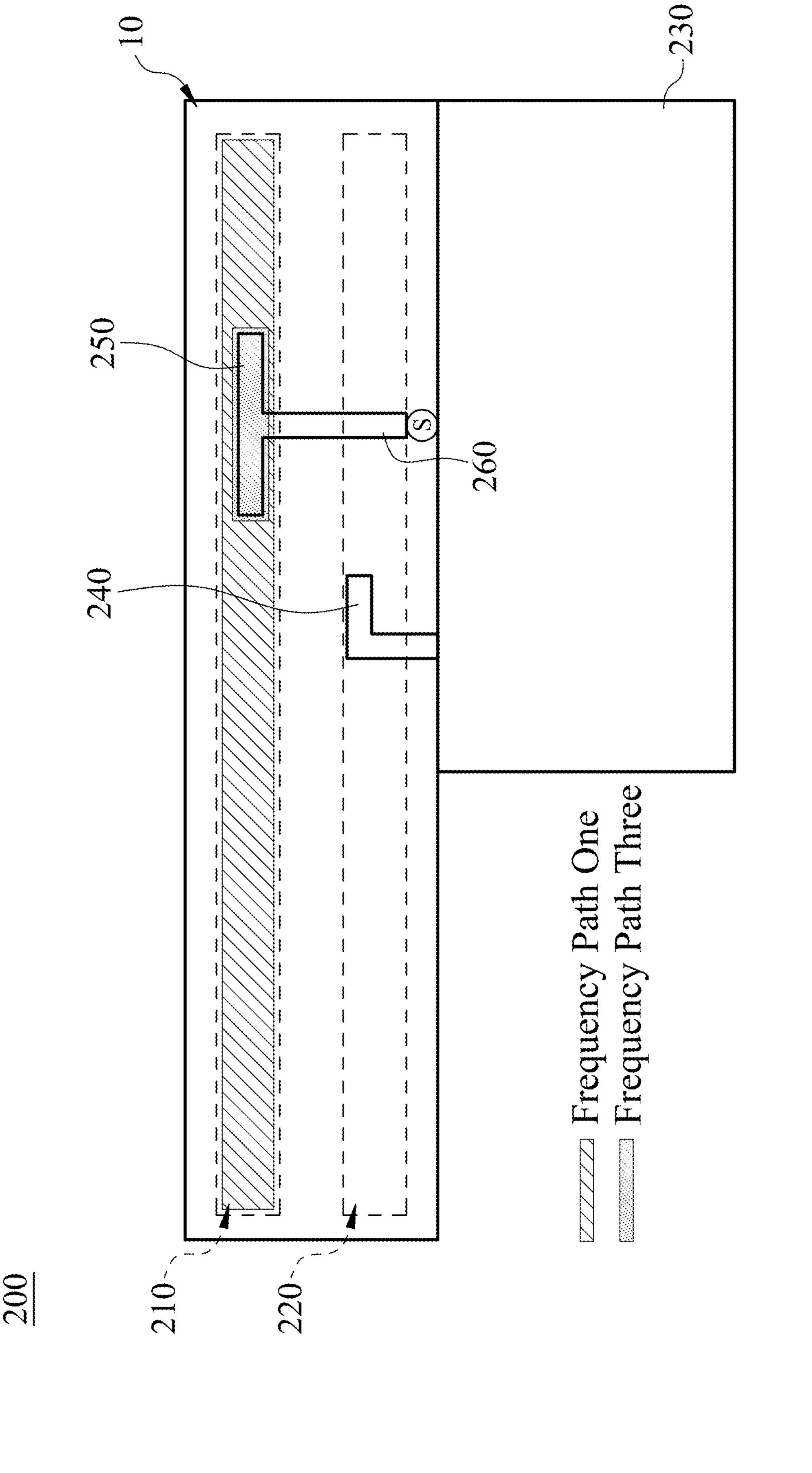
FIG. 6 is a schematic diagram illustrating frequency paths one and three of the antenna structure shown in FIG. 5.
Figure 7:
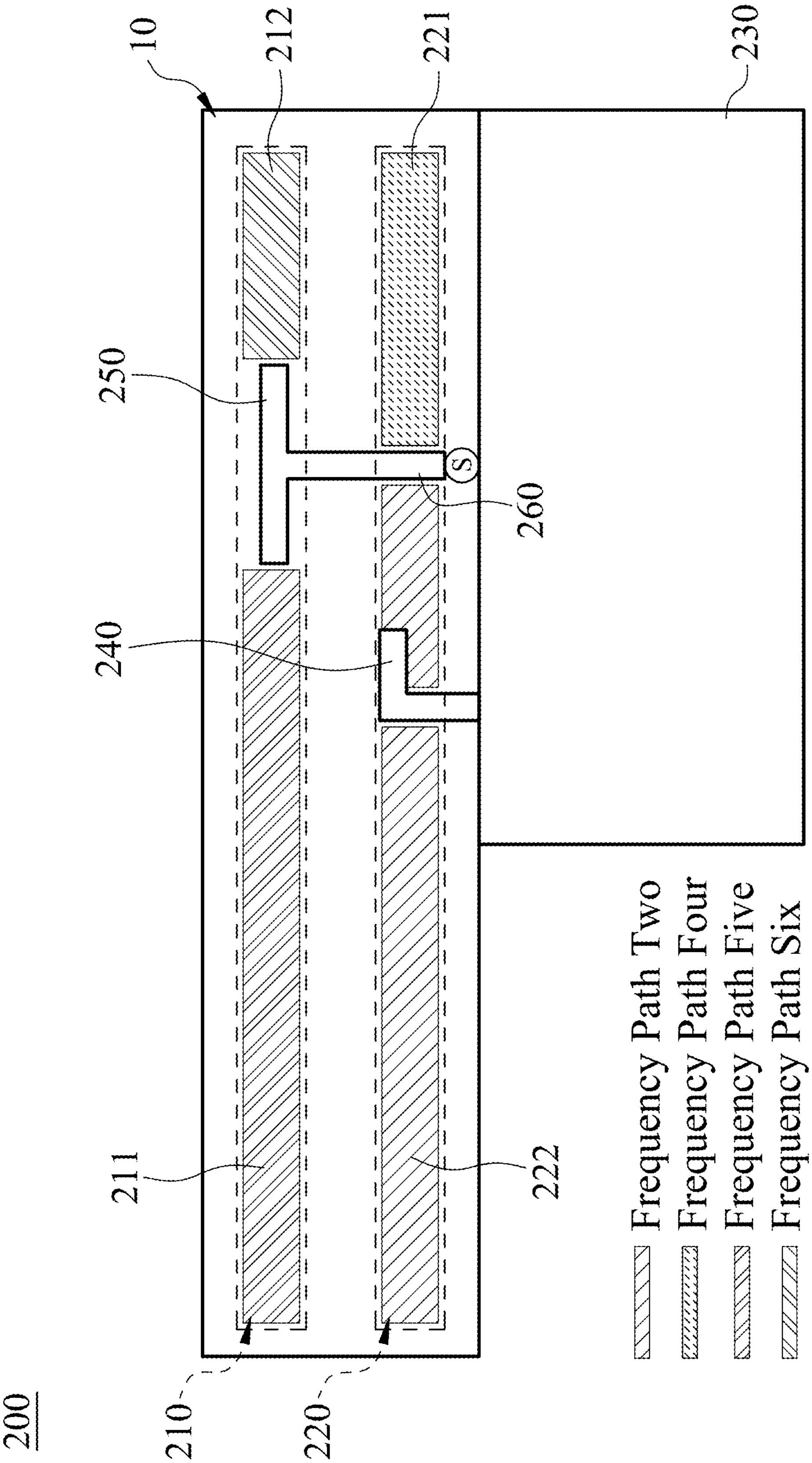
FIG. 7 is a schematic diagram illustrating frequency paths two, four, five, and six of the antenna structure shown in FIG. 5.
Figure 8:
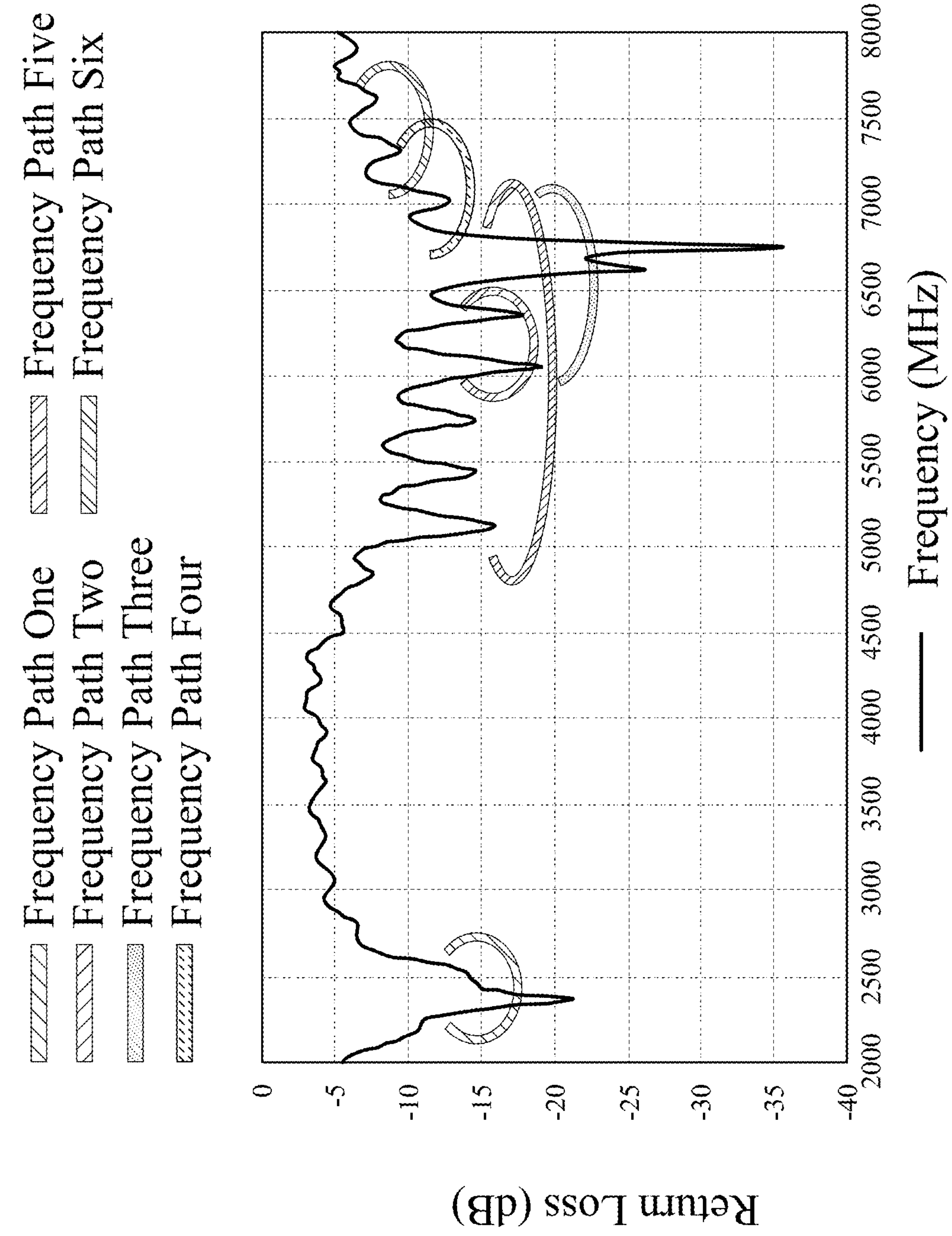
FIG. 8 is a graph illustrating overall bandwidth waveform of frequency and return loss of the antenna structure shown in FIG. 5.

FIG. 6 is a schematic diagram illustrating frequency paths one and three of the antenna structure 200 shown in FIG. 5. FIG. 7 is a schematic diagram illustrating frequency paths two, four, five, and six of the antenna structure 200 shown in FIG. 5. FIG. 8 is a graph illustrating overall bandwidth waveform of frequency and return loss of the antenna structure 200 shown in FIG. 5.

Referring to FIGS. 6 and 8, the antenna structure 200 provides the frequency paths one and three through the radiating portion 250. The radiating portion 250 couples and excites the first slot 210 to form the frequency path one, providing a resonant frequency between 2300 MHz and 2700 MHz. The radiating portion 250 itself forms the frequency path three, providing a resonant frequency between 6000 MHz and 7100 MHz.

Therefore, through the coupling and excitation of the radiating portion 250, the frequency path one formed by the first slot 210 can provide low-frequency characteristics. The frequency path three formed by the radiating portion 250 itself can provide some mid-to-high frequency characteristics.

Referring to FIGS. 7 and 8, the antenna structure 200 provides multiple frequency paths, including frequency paths two, four, five and six, through the radiating portion 250. The feeding portion 260 divides the second slot 220 into a first portion 221 and a second portion 222. The first portion 221 and the second portion 222 are not equal in length. In the second embodiment, the length of the second portion 222 is greater than the length of the first portion 221. The length of the first portion 221 is 12.5 millimeters, and the length of the second portion 222 is 36.5 millimeters, but the present disclosure is not limited thereto. The radiating portion 250 divides the first slot 210 into a first section 211 and a second section 212. The first section 211 and the second section 212 are not equal in length. In the second embodiment, the length of the first section 211 is greater than the length of the second section 212. The length of the first section 211 is 32.5 millimeters, and the length of the second section 212 is 9 millimeters, but the present disclosure is not limited thereto. The radiating portion 250 couples and excites the second portion 222 to form the frequency path two, providing a resonant frequency between 4850 MHz and 6800 MHz. The radiating portion 250 couples and excites the first portion 221 to form the frequency path four, providing a resonant frequency between 6200 MHz and 7500 MHz. The radiating portion 250 couples and excites the first section 211 to form the frequency path five, providing a resonant frequency between 5800 MHz and 6500 MHz. The radiating portion 250 couples and excites the second section 212 to form the frequency path six, providing a resonant frequency between 7000 MHz and 7800 MHz.

Therefore, through the coupling and excitation of the radiating portion 250, the frequency path two formed by the second portion 222 can provide some mid-to-high frequency characteristics. The frequency path four formed by the first portion 221 can provide some high-frequency characteristics. The frequency path five formed by the first section 211 can provide some mid-to-high frequency characteristics. The frequency path six formed by the second section 212 can provide Wi-Fi 6E characteristics.

In view of the above, the present disclosure has the following advantages. First, the antenna structure of the present disclosure can excite transmission signals of multiple frequency bands by utilizing the positional arrangement of the first slot, the second slot, the short-circuiting portion, the radiating portion, and the feeding portion. Second, the resonant frequencies excited by the antenna structure of the present disclosure can meet the Wi-Fi 6E frequency band requirements, providing a wider bandwidth and better antenna efficiency. Third, the antenna structure of the present disclosure can be integrated with the device according to the spatial configuration of the device in which it is installed, overcoming the limitation on antenna positioning.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure disposed on a metal unit, the antenna structure comprising:
- a first slot formed on the metal unit;
- a second slot formed on the metal unit and located at one side of the first slot, wherein the second slot is configured to receive a signal feed; and
- a short-circuiting portion extending across the first slot, wherein the short-circuiting portion is in a floating state and does not directly contact the first slot.

2. The antenna structure according to claim 1, further comprising:
- a grounding portion coupled to the metal unit;
- a radiating portion corresponding to the second slot; and
- a feeding portion disposed on the metal unit adjacent to the radiating portion and located on one side of the second slot away from the first slot, wherein the feeding portion is configured to provide the signal feed.

3. The antenna structure according to claim 2, wherein the first slot is formed on the metal unit along a first axis direction, the second slot is formed on the metal unit along a second axis direction, the first axis direction and the second axis direction are parallel, and the first slot and the second slot are spaced apart by a spacing.

4. The antenna structure according to claim 3, wherein the short-circuiting portion extends across the first slot in a direction perpendicular to the first axis direction.

5. The antenna structure according to claim 3, wherein a first length of the first slot along the first axis direction is equal to a second length of the second slot along the second axis direction.

6. The antenna structure according to claim 2, wherein the short-circuiting portion divides the first slot into a first portion and a second portion, and the first portion and the second portion are not equal in length.

7. The antenna structure according to claim 6, wherein a resonant frequency of the radiating portion coupling with the first portion is between 6200 MHz and 7500 MHz, and a resonant frequency of the radiating portion coupling with the second portion is between 4850 MHz and 6800 MHz.

8. The antenna structure according to claim 2, wherein a resonant frequency of the radiating portion is between 6000 MHz and 7100 MHz, and a resonant frequency of the radiating portion coupling with the second slot is between 2300 MHz and 2700 MHz.

9. The antenna structure according to claim 2, wherein the radiating portion divides the second slot into a first section and a second section, and the first section and the second section are not equal in length.

10. The antenna structure according to claim 9, wherein a resonant frequency of the radiating portion coupling with the first section is between 5800 MHz and 6500 MHz, and a resonant frequency of the radiating portion coupling with the second section is between 7000 MHz and 7800 MHz.

* * * * *